(12) United States Patent
Overton

(10) Patent No.: US 7,180,539 B2
(45) Date of Patent: Feb. 20, 2007

(54) LUMINANCE QUALIFIED VECTOR DISPLAY

(75) Inventor: Michael S. Overton, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 649 days.

(21) Appl. No.: 10/198,973

(22) Filed: Jul. 18, 2002

(65) Prior Publication Data

US 2004/0012605 A1 Jan. 22, 2004

(51) Int. Cl.
*H04N 17/00* (2006.01)
*H04N 17/02* (2006.01)

(52) U.S. Cl. .................. 348/186; 348/180; 348/184

(58) Field of Classification Search ............... 348/186, 348/180, 182, 184; 345/589; *H04N 17/00, H04N 17/02*
See application file for complete search history.

(56) References Cited

U.S. PATENT DOCUMENTS

| | | | |
|---|---|---|---|
| 4,811,083 A | | 3/1989 | Matney |
| 4,875,089 A | * | 10/1989 | Judge ..................... 348/186 |
| 5,122,863 A | | 6/1992 | Zortea |
| 5,150,214 A | * | 9/1992 | Shin et al. ............... 348/625 |
| 5,519,440 A | * | 5/1996 | Baker ..................... 348/186 |
| 5,642,161 A | * | 6/1997 | Jefferson ................. 348/186 |
| 6,288,755 B1 | * | 9/2001 | Yun ........................ 348/673 |
| 6,493,024 B1 | * | 12/2002 | Hartley et al. .......... 348/180 |

OTHER PUBLICATIONS

Patent Abstract of Japan, Hitachi Denshi Ltd, Sep. 10, 1998.

* cited by examiner

*Primary Examiner*—Trang Tran
(74) *Attorney, Agent, or Firm*—Francis I. Gray; Michael A. Nelson; Matthew D. Rabdau

(57) ABSTRACT

A luminance qualified vector display device provides a vector display that is gated by a specified luminance range. In one implementation three luminance gates may be used, one for luminance levels above a specified high luminance threshold, a second for luminance levels below a specified low luminance threshold, and a third for luminance levels between the specified high and low luminance thresholds. Also the luminance thresholds for the medium luminance range may be separately adjusted to overlap the high and low luminance ranges respectively. Each luminance qualified vector display may be displayed separately, may be overlaid for display using a different color for each luminance range, or may be displayed in different quadrants of a display device or window together with the normal, non-luminance qualified, vector display.

21 Claims, 3 Drawing Sheets

LOW

MID

HIGH

LUMINANCE QUALIFIED VECTOR DISPLAY

BACKGROUND OF THE INVENTION

The present invention relates to video measurement displays, and more particularly to a luminance qualified vector display for a video signal.

A vector display is a representation of the color components (i.e., R-Y, B-Y) of a video signal on a two-dimensional x-y plot. The vector display is typically used to setup cameras and other video sources using a standard color bar signal, for example. This is an incomplete representation of color space as there is no luminance (Y) information, so that both black and white map to the center of the display screen. Thus the color shows up the same on the vector display whether it is in shadow or bright light.

Other color space representations, such as the Tektronix "Lightning" and "Diamond" displays (U.S. Pat. Nos. 4,635,094 and 5,307,087), show both color and luminance, but are generally less accepted in the marketplace. Also many color correctors, such as those by DaVinci Systems, have track balls that move the colors in the same orientation as seen on the vector display.

What is desired is a modified vector display that takes into consideration luminance information to isolate black errors or to see an imbalance in whites.

BRIEF SUMMARY OF THE INVENTION

Accordingly the present invention provides a luminance qualified vector display device where a vector display is gated by a specified luminance range. In one implementation three luminance gates may be used, one for luminance levels above a specified high luminance threshold, a second for luminance levels below a specified low luminance threshold, and a third for luminance levels between the specified high and low luminance thresholds. Also the luminance thresholds for the medium luminance range may be separately adjusted to overlap the high and low luminance ranges respectively. Each luminance qualified vector display may be displayed separately, may be overlaid for display using a different color for each luminance range, or may be displayed in different quadrants of a display device or window together with the normal, non-luminance qualified, vector display.

The objects, advantages and other novel features of the present invention are apparent from the following detailed description when read in conjunction with the appended claims and attached drawing.

DETAILED DESCRIPTION OF THE INVENTION

Figure 1:
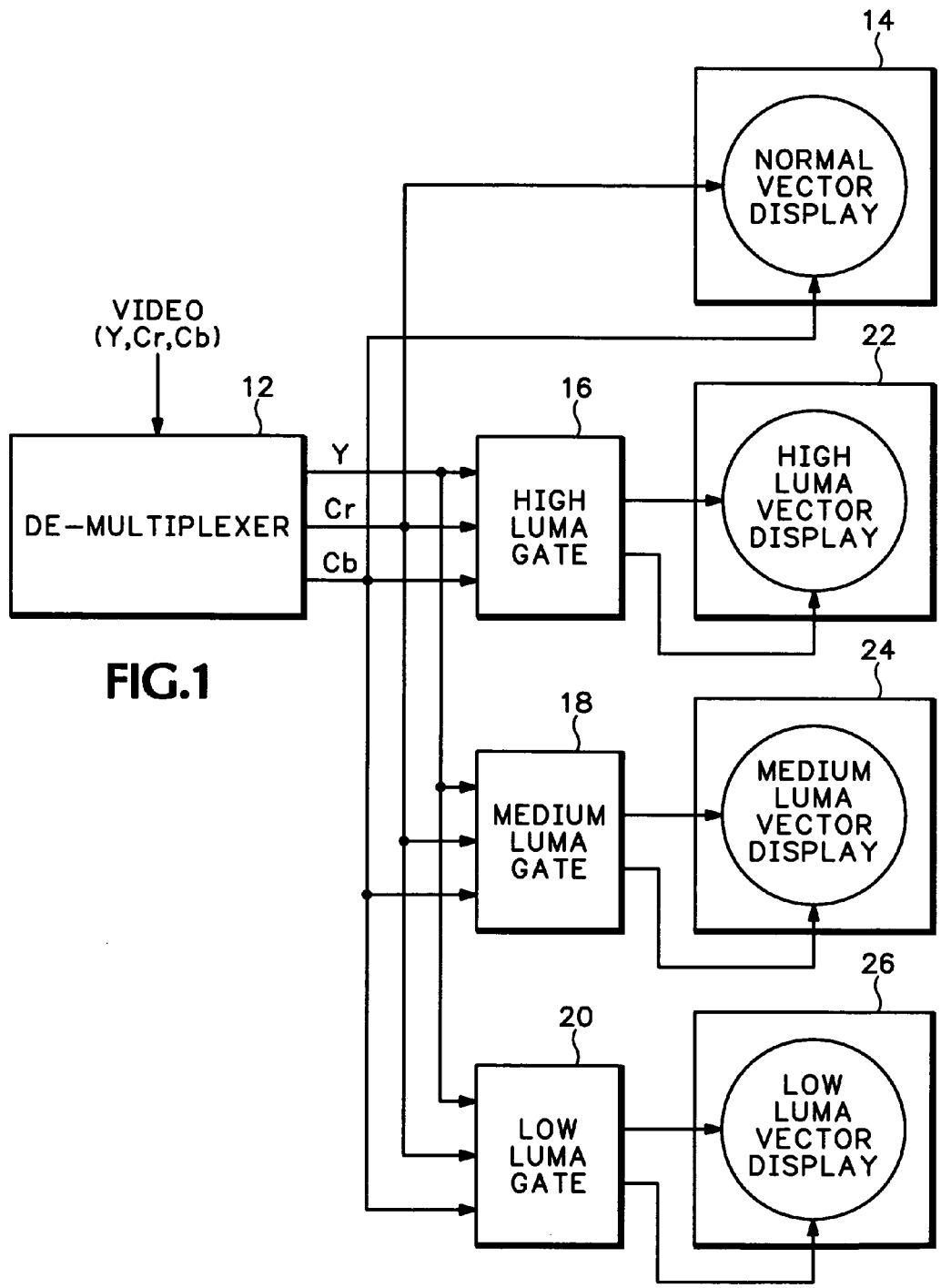
FIG. 1 is a simplified block diagram view of a luminance qualified vector display device according to the present invention.

The modification to the standard vector display described below allows a user to only display the vector display for video signals, or portions thereof, within specified ranges of luminance. For example to isolate black errors only color components having low luminance are displayed, or to see an imbalance in whites only color components having high luminance are displayed. Referring now to FIG. 1, a traditional vector display device extracts the color components from an input color video signal having luminance and orthogonal color components, such as via a de-multiplexer 12 for component video, and uses the color components to drive the X- and Y-axes of a display device or window to provide a normal vector display 14. The traditional vector display device is modified by including one or more luminance gates 16, 18, 20 that serve to inhibit or pass the color components to the display device or window according to the level of the luminance component in the video signal. As shown there are three different luminance gates 16, 18, 20 that respond to three different ranges of luminance levels. There may also be an overlap between adjacent luminance ranges.

A high luminance gate 16 receives the luminance component (Y) and the two color components (R-Y, B-Y or Cr, Cb) and passes the color components to the display device or window as a high luminance vector display 22 when the luminance component exceeds a specified high luminance threshold level, such as 80% of a 700 mv nominal white level. Likewise a low luminance gate 20 receives the luminance and color components and passes the color components to the display device or window as a low luminance vector display 26 when the luminance component is less than a specified low luminance threshold level, such as 20% of the nominal white level. A medium luminance gate 18 also receives the luminance and color components and passes the color components to the display device or window as a medium luminance vector display 24 when the luminance component is greater than the specified low luminance threshold level and less than the specified high luminance threshold level. Alternatively the luminance threshold levels applied to the medium luminance gate 18 may be lower than the specified low luminance threshold level and higher than the specified high luminance threshold level respectively in order to provide an overlap between the medium luminance gate 18 and the respective high and low luminance gates 16, 20. All of these threshold levels may be user controlled and variable, if desired, rather than merely being preset by the manufacturer.

Figure 2:
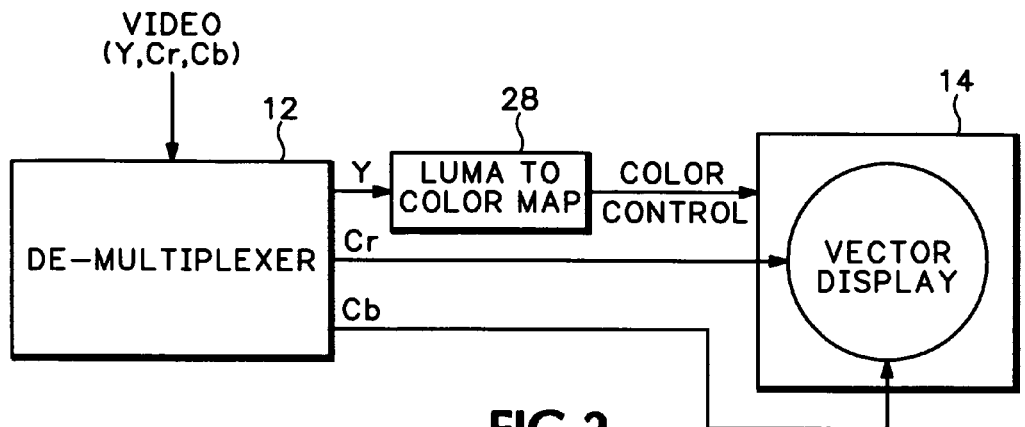
FIG. 2 is a simplified block diagram view of another embodiment of a luminance qualified vector display device according to the present invention.

The display device or window may just display one of the vector displays 22, 24, 26 from the luminance gates 16, 18, 20, i.e., with no overlap only the luminance gate producing a vector display is displayed. Also the vector displays 22, 24, 26 from the different luminance gates 16, 18, 20 may be displayed in different colors on the display device or window, either as different vector displays or as an overlaid display of all three vector displays. For example, as shown in FIG. 2, the luminance value may be input to a luminance to color map 28, which may be in the form of a lookup table, that provides a color control signal to the vector display 14 so that when the luminance value is below the specified low threshold level the vector display is controlled to display one color, when the luminance value is above the specified high threshold the vector display is controlled to display a second color, and otherwise the vector display is controlled to display a third color.

Figure 3:
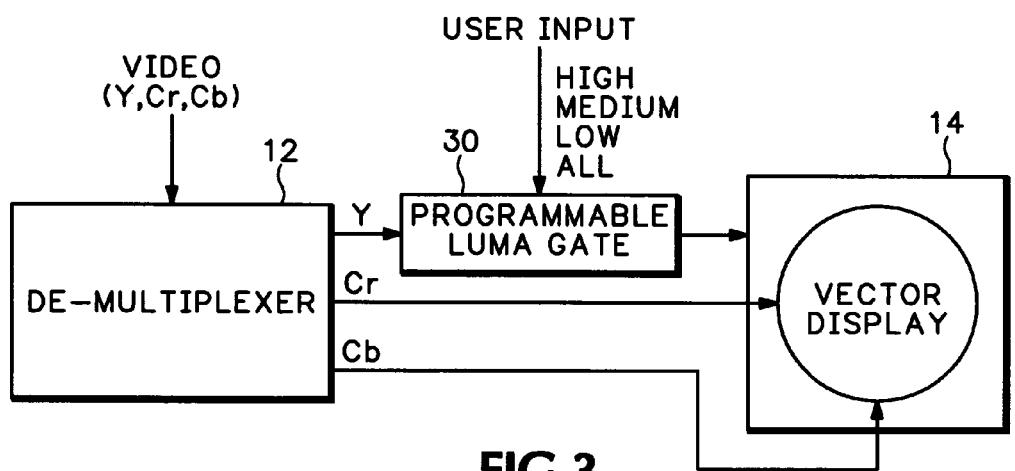
FIG. 3 is a simplified block diagram view of still another embodiment of a luminance qualified vector display device according to the present invention.

Alternatively the vector displays 22, 24, 26 from all of the luminance gates 16, 18, 20 as well as the normal vector display 14 without luminance qualification may be displayed simultaneously in different quadrants of the display device or window. Further, rather than having three separate luminance gates 16, 18, 20, a single programmable luminance gate 30 may be used, as shown in FIG. 3. The programmable luminance gate 30 is controlled by a user input that determines whether high, medium or low luminance qualified color vector is displayed on the vector display 14, or whether all (unqualified) color vector is displayed.

Figure 4:
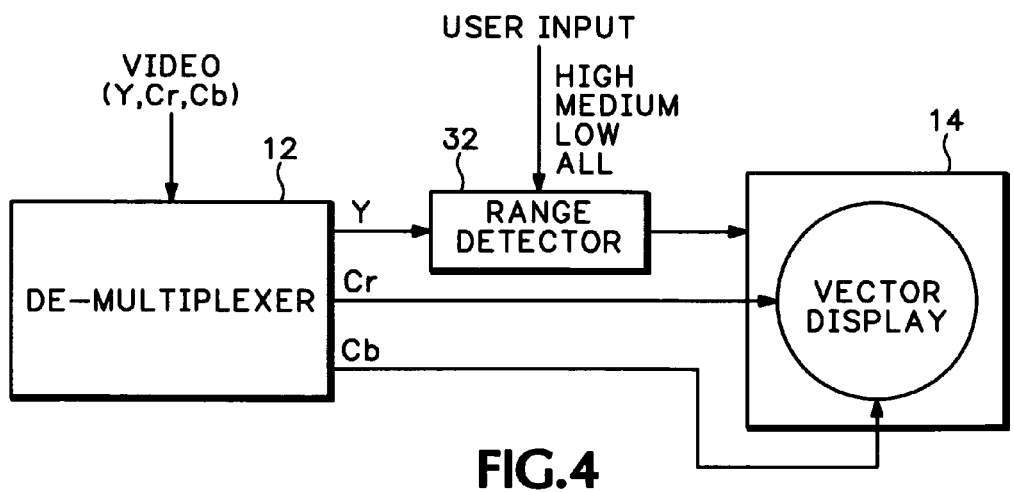
FIG. 4 is a simplified block diagram view of yet another embodiment of a luminance qualified vector display device according to the present invention.

Also the luminance qualified vector display may be implemented on a traditional analog stroke CRT display as shown in FIG. 4, using the "Z-axis" intensity control as the luminance "gate" to blank the vector display 22, 24, 26 when the luminance component of the video signal is not in the desired range. In this instance the luminance component is input to a luminance range detector 32 with the luminance range being determined by the user input as being either high, medium, low or all.

A user interface may have several buttons, either software or hardware, for controlling the luminance qualified vector display device. Where there is room on the vector display 14 for only one display, some buttons may allow the user to select between low, medium and high level luminance, as found on color correctors, or to match the controls used to set up cameras. Other buttons may allow the user to adjust the low and high luminance threshold levels or to select the traditional, non-luminance qualified, vector display 14. The display on the display device or window may be either a single vector display, or a multiple vector display as described above. The multiple vector display corresponds exactly to controls on the color corrector and increases the efficiency of this time-consuming process. Typical users include telecine colorists and people performing camera shading.

Figure 5:
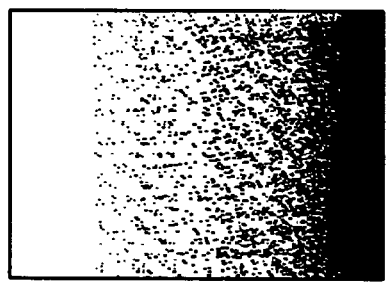
FIG. 5 is a plan view of a picture to be analyzed according to the present invention.
Figure 6A:
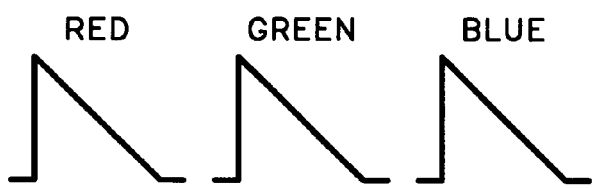
FIGS. 6a and 6b are a parade waveform display of the color components (idealized) for the picture of FIG. 5 and a corresponding vector diagram display.
Figure 6B:
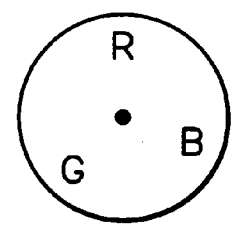

Referring now to FIG. 5 a picture is shown that starts with white on the left edge, shading to gray and finally to black on the right edge. The picture is composed of equal red, green and blue components, each starting at full luminance and ramping down to zero in each line of the video, as shown in FIG. 6a. Each of these contributing colors must have the exact same amplitude as the others at each point in time or else there is an unbalance and the gray of the picture takes on some other hue. Note as shown in FIG. 6b that the vector diagram displays only a single dot in the center because the ideal component signals are perfectly matched to each other.

Figure 7A:
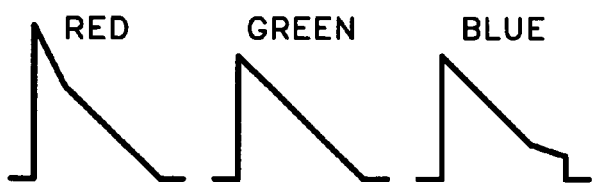
FIGS. 7a and 7b are a parade waveform display of the color components with unbalance for the picture of FIG. 5 and a corresponding vector diagram display.
Figure 7B:
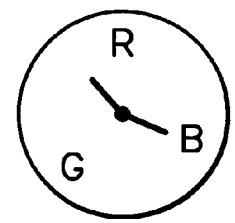
Figure 8A:
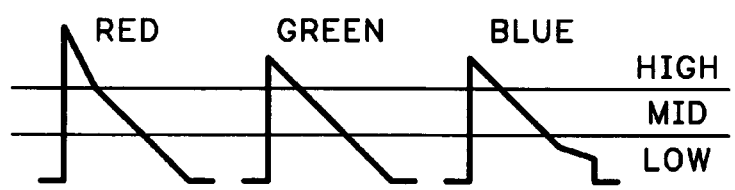
FIGS. 8a, 8b, 8c and 8d are a parade waveform display of the color components with unbalance for the picture of FIG. 5 and multiple vector diagram displays according to the present invention.
Figure 8B:
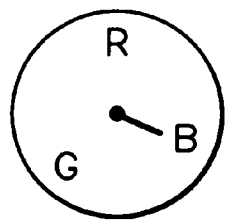
Figure 8C:
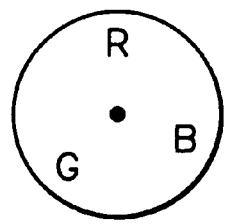
Figure 8D:
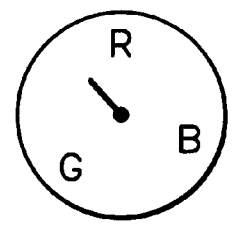

Referring to FIG. 7a a groups of component signals is shown that are other than ideal. Note the change in inflection of the red component at the left side and the change in the blue component at the right side. FIG. 7b shows the corresponding vector diagram display showing small excursions in the blue and red directions, but does not indicate from looking just at the vector display the corresponding luminance ranges in which these excursions occur. By dividing the amplitude range into multiple sub-ranges, as described above and shown in FIG. 8a, and plotting only the data for one sub-range into each of multiple vector diagrams as shown in FIGS. 8b, 8c and 8d, it is possible to isolate individual errors. In this example the three vector diagrams show that the red error occurs at high levels of luminance and the blue error occurs in the shadows, i.e., at low levels of luminance.

Thus the present invention provides a luminance qualified vector display by gating the vector display according to a specified luminance range—high, medium and low, for example, and displaying the results either separately or simultaneously, with or without the non-luminance qualified normal vector display.

What is claimed is:

1. A method of generating a luminance qualified vector display comprising the steps of:
   gating color components of a video signal according to a specified luminance range for a luminance component of the video signal; and
   displaying the color components passed by the gating step as the luminance qualified vector display, wherein the gating step comprises the steps of:
   high luma gating the color components using a specified high luminance threshold to define a high luminance range as the specified luminance range to pass the color components to the displaying step when the luminance component is greater than the specified high luminance threshold;
   low luma gating the color components using a specified low luminance threshold to define a low luminance range as the specified luminance range to pass the color components to the displaying step when the luminance component is less than the specified low luminance threshold; and
   medium luma gating the color components to pass those color components to the displaying step when the luminance component is less than or equal to the specified high luminance threshold and greater than or equal to the specified low luminance threshold to define a medium luminance range as the specified luminance range.

2. The method as recited in claim 1 wherein the displaying step comprises the steps of:
   selecting the color components from one of the high, low and medium luma gating steps for input to the displaying step; and
   displaying the selected color components as the luminance qualified vector display.

3. The method as recited in claim 1 wherein the displaying step comprises the step of simultaneously displaying the color components from each of the high, low and medium luma gating steps.

4. The method as recited in claim 3 wherein the simultaneously displaying step comprises the steps of:
   assigning a different color to each of the color components output from each of the high, low and medium luma gating steps; and
   combining the color components to produce a combined vector display as the luminance qualified vector display, the different color indicating the particular specified luminance range of the color components.

5. The method as recited in claim 3 wherein the simultaneously displaying step comprises the step of displaying the color components from each of the high, low and medium luma gating steps in separate display areas of a display device.

6. The method as recited in claim 5 wherein the simultaneously displaying step further comprises the step of displaying the color components of the video signal directly without processing by the high, low and medium luma gating steps in a display area of the display device separate from the separate display areas for the high, low and medium luma gating steps.

7. The method as recited in claim 1 wherein the specified luminance range for the medium luma gating step is specified by a low luminance threshold less than the specified low luminance threshold and a high luminance threshold greater than the specified high luminance threshold to provide an overlap between the high and low luminance ranges with the medium luminance range.

8. An apparatus for generating a luminance qualified vector display comprising:

means for gating color components of a video signal according to a specified luminance range for a luminance components of the video signal; and means for displaying the color components passed by the gating means as the luminance qualified vector display, wherein the gating means comprises:

means for high luma gating the color components using a specified high luminance threshold to define a high luminance range as the specified luminance range to pass the color components to the displaying means when the luminance component is greater than the specified high luminance threshold;

means for low luma gating the color components using a specified low luminance threshold to define a low luminance range as the specified luminance range to pass the color components to the displaying means when the luminance component is less than the specified low luminance threshold; and means for medium luma gating the color components to pass those color components to the displaying means when the luminance component is less than or equal to the specified high luminance threshold and greater than or equal to the specified low luminance threshold to define a medium luminance range as the specified luminance range.

9. The apparatus as recited in claim 8 wherein the displaying means comprises:

means for selecting the color components from one of the high, low and medium luma gating means for input to the displaying means; and means for displaying the selected color components as the luminance qualified vector display.

10. The apparatus as recited in claim 8 wherein the displaying means comprises means for simultaneously displaying the color components from each of the high, low and medium luma gating means.

11. The apparatus as recited in claim 10 wherein the simultaneously displaying means comprises:

means for assigning a different color to each of the color components output from each of the high, low and medium luma gating means; and means for combining the color components to produce a combined vector display as the luminance qualified vector display, the different color indicating the particular specified luminance range of the color components.

12. The apparatus as recited in claim 10 wherein the simultaneously displaying means comprises means for displaying the color components from each of the high, low and medium luma gating means in separate display areas of a display device.

13. The apparatus as recited in claim 12 wherein the simultaneously displaying means further comprises means for displaying the color components of the video signal directly without processing by the high, low and medium luma gating means in a display area of the display device separate from the separate display areas for the high, low and medium luma gating means.

14. The apparatus as recited in claim 8 wherein the specified luminance range for the medium luma gating means is specified by a low luminance threshold less than the specified low luminance threshold and a high luminance threshold greater than the specified high luminance threshold to provide an overlap between the high and low luminance ranges with the medium luminance range.

15. An apparatus for generating a luminance qualified vector display comprising:

a luminance gate having color components of a video signal as inputs, and providing the color components as outputs if a luminance component of the video signal is within a specified luminance range; and a display device coupled to the outputs of the luminance gate for displaying the color components from the luminance gate as the luminance qualified vector display, wherein the luminance gate comprises:

a high luma gate having the color components as inputs and providing the color components as outputs when the corresponding luminance component exceeds a specified high luminance threshold that defines a high luminance range as the specified luminance range;

a low luma gate having the color components as inputs and providing the color components as outputs when the corresponding luminance component is less than a specified low luminance threshold that defines a low luminance range as the specified luminance range; and a medium luma gate having the color components as inputs and providing the color components as outputs when the corresponding luminance component is between the specified high and low luminance thresholds that defines a medium luminance range as the specified luminance range.

16. The apparatus as recited in claim 15 wherein the displaying means comprises a switch for selecting the color components from one of the high, low an medium luma gates for input to the display device, the display device displaying the selected color components as the luminance qualified vector display.

17. The apparatus as recited in claim 15 wherein the display device simultaneously displays the color components from each of the high, low and medium luma gates.

18. The apparatus as recited in claim 17 wherein the display device further comprises a combiner having the color components from each of the high, low and medium luma gates as inputs that assigns a different color to each of the color components from each of the high, low and medium luma gates and produces a combined vector display at an output as the luminance qualified vector display to the display device, the different color indicating the particular specified luminance range of the color components.

19. The apparatus as recited in claim 17 wherein the display device further comprises a combiner having the color components from each of the high, low and medium luma gates as inputs and outputs the color components from each of the high, low and medium luma gates in separate display areas of the display device as the luminance qualified vector display.

20. The apparatus as recited in claim 19 wherein the combiner further has the color components from the video signal directly as an additional input and outputs the color components from the video signal in combination with the color components from each of the high, low and medium luma gates in an area of the display device separate from the separate display areas for the high, low and medium luma gates as the luminance qualified vector display.

21. The apparatus as recited in claim 15 wherein the specified luminance range for the medium luminance range is specified by a low luminance threshold less than the specified low luminance threshold and a high luminance threshold greater than the specified high luminance threshold to provide an overlap between the high and low luminance ranges with the medium luminance range.

* * * * *